Dec. 6, 1927.　　　　　W. B. WRIGHT ET AL　　　　1,651,655
VACUUM JACKETED CONTAINER
Filed Nov. 10, 1919　　　2 Sheets-Sheet 1

Inventors.
William B. Wright
William M. Fairfax by William M. Fairfax
Attorney.

Dec. 6, 1927.
W. B. WRIGHT ET AL
1,651,655
VACUUM JACKETED CONTAINER
Filed Nov. 10, 1919
2 Sheets-Sheet 2
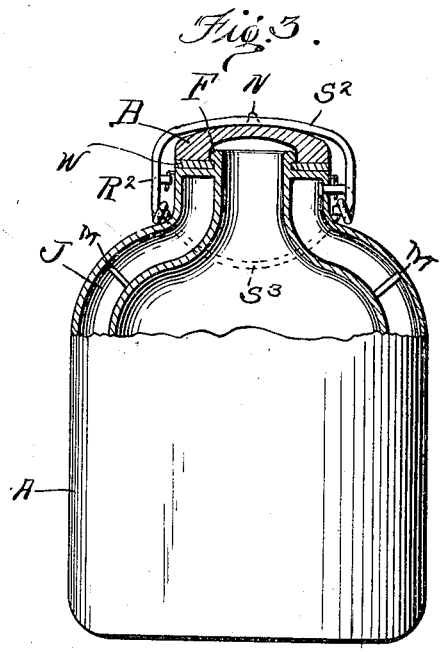
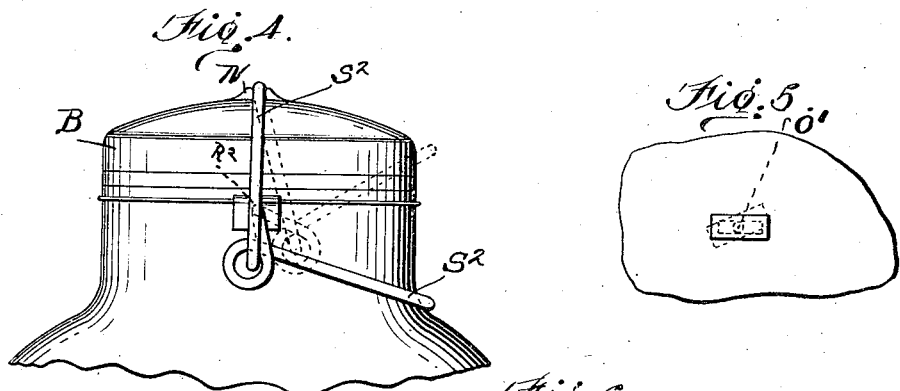
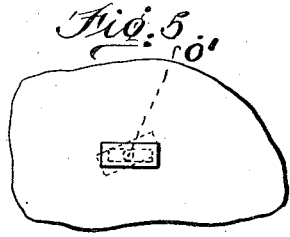
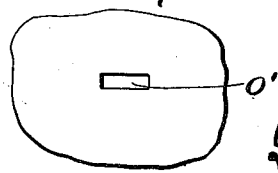
Inventors.
William B. Wright
William M. Fairfax
by William M. Fairfax
Attorney.

Patented Dec. 6, 1927.

1,651,655

UNITED STATES PATENT OFFICE.

WILLIAM B. WRIGHT AND WILLIAM M. FAIRFAX, OF WASHINGTON, DISTRICT OF COLUMBIA.

VACUUM-JACKETED CONTAINER.

Application filed November 10, 1919. Serial No. 336,797.

Hitherto vacuum-jacketed containers to hold various substances (usually food products) such as ice-cream, milk, etc., which it is desirable to maintain at a uniform temperature for a certain length of time for example a few hours or even a day or more have been made to maintain during their life in their surrounding heat insulating jackets a vacuum as stable as possible.

An illustration of such containers is found in the so called "Dewar vacuum bottle", which is normally used to maintain for a limited time either hot or cold food products or other similar materials at an approximately predetermined uniform temperature, that is either at a certain low temperature, such as that of ice, or at a certain high temperature, such as that of boiling water.

When such receptacles or containers, such as a "Dewar vacuum bottle" are confined to individual or family use they are of advantage and perform a desirable function. Such containers are not however suitable for shipping to a distance food or other similar products such as ice-cream, cream, milk, oysters, fruits or vegetables because they are expensive to make, are usually relatively frail and are liable for reasons given herein not to be returned to the shipper or seller. For the ultimate purchaser or consumer would be induced to keep them in most cases for their own use, and this obviously would result in a great loss to the producer, seller or shipper as the case may be.

Therefore, it would be necessary in order to cover this normally unavoidably loss to charge such rates upon the food or other products shipped in these vacuum containers as would result in prices being imposed, which would be practically prohibitive to the wide and extended shipment and sale of such products.

The above named defects of structure of such containers and resultant limited use of them are avoided by the satisfactory cheap and serviceable container which is involved in our invention, which new container is characterized by having simple and efficient means for destroying or breaking the vacuum when the container is opened to obtain access to the food or other similar products found therein.

Our invention therefore relates to an entirely new kind of vacuum container wherein when the delivery to the ultimate purchaser or consumer is made, the vacuum is broken and the container thereafter rendered of little use to purchaser after the container has been opened. For when said container is opened, the vacuum is broken and the container becomes a simple vessel having little or no heat insulating qualities and therefore is of no especial use to the ultimate purchaser or consumer after said container has been opened. Hence it is to the interest of the ultimate purchaser or consumer to return said container to the shipper or his principal, or the agent of either for the consideration of a moderate rebate.

Applicants' container comprises essentially, a vacuum jacket or compartment, an air depleting or exhausting means such as a valve for exhausting the air in said jacket or compartment, an air intake valve normally hermetically sealed, which on being opened, breaks the vacuum in the jacket, and means operated by, or connected with, the cover of the container to operate the air intake valve.

For the reasons above named, applicants consider themselves to be the first and original inventors of a commercially practical vacuum-jacketed container wherein a serviceable vacuum is maintained until such time as the container's cover is opened for the removal of the enclosed food products. Thus the said food products are maintained at a desired temperature until delivery and then the vacuum in the container's jacket or compartment is broken in an efficient way so as to render the container substantially useless to the ultimate purchaser or user after the said container has been opened.

Turning now to the drawings which form part of the application and specification:

Figures 3 and 4 show another form of container wherein a "fruit jar" type of spring holds down the cover of the container and likewise holds closed e. g. by a washer a rotary air intake valve which intake valve admits air through its port into the vacuum jacket when the cover of the container is raised or removed;

Figures 5 and 6 show a top plan view in broken outline of an air intake valve which is opened and closed by the rotary movement of the valve stem of the structure shown in Figures 3 and 4;

J is the vacuum jacket or compartment around the said container and V is the depleting or exhaust valve for the said vacuum jacket or compartment whereby air is depleted from said jacket. The cover B should be made either of efficient heat insulating material of the proper thickness or it should be formed of a chamber either filled with air permanently or else forming in itself a relatively small vacuum jacket J' entirely separated and distinct from the main vacuum jacket or compartment J, it being obvious that when B is in the form of a vacuum jacket it should have its own separate and distinct air exhausting valve, V', whereby it can also be exhausted of air through a separate pipe at the same time the main vacuum chamber or compartment J is depleted or else could be exhausted by the same exhausting pump apparatus before or after the main vacuum jacket J is depleted. But in all cases when the cover B is in the form of a vacuum jacket it is to be absolutely separate and distinct and in no way connected with the main vacuum jacket or compartment J around the body of the container. For it is an essential feature of our container that there shall be no connection between the main vacuum jacket or compartment J and any other chamber such as the relatively small vacuum chamber forming the cover B if said cover is in the form of a vacuum chamber, since any connection between the main vacuum chamber or compartment J and any other chamber, which connection is broken upon the opening of the container, would inevitably lead, in use, to the leakage of air into the main vacuum chamber so as to destroy almost completely its function and certainly would impair most materially its efficiency.

The inner chamber A' of the container is intended to hold the food product or other substance which is to be shipped, such, for example, as ice cream, cream, milk, fruits or vegetables. The top of the container is held closed by any of the means shown. When the food or other substance to be shipped has been placed in the chamber A' the air is exhausted from the vacuum jacket or compartment J after the cover has been closed down upon the container. The container is then ready to be shipped to any desired point.

In some cases the vacuum jacket or compartment of the container could be made of or lined with heat insulating material.

It is then apparent that the food or other product carried in the container will be maintained at an approximately fixed temperature until its has reached its destination and the cover has been raised or opened, when the release of pressure of the cover will release the washer or other air inlet cover over the air intake valve O and promptly destroy the vacuum in the vacuum jacket J.

Figure 1:
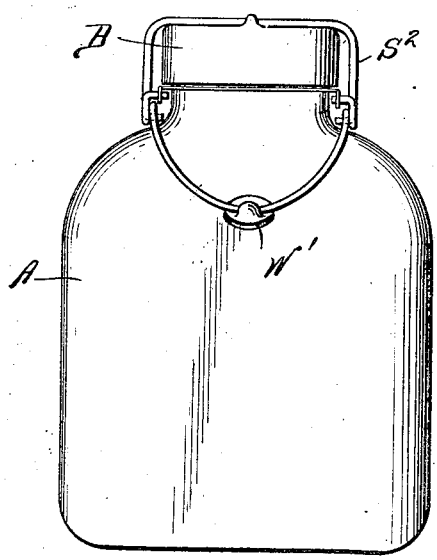
Figures 1 and 2 show, respectively, in elevation and partial broken section, a modified container wherein, when the container's cover is closed, the port of the air intake valve into the vacuum jacket is normally tightly sealed by a washer held down on the port of the said intake valve by a spring of the "fruit jar" type.
Figure 2:
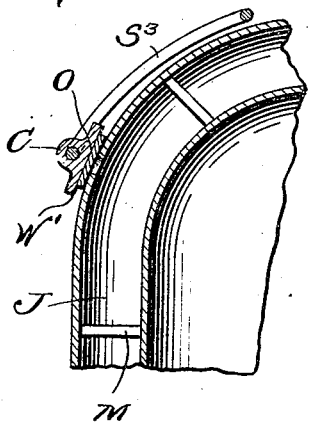
Figure 8:
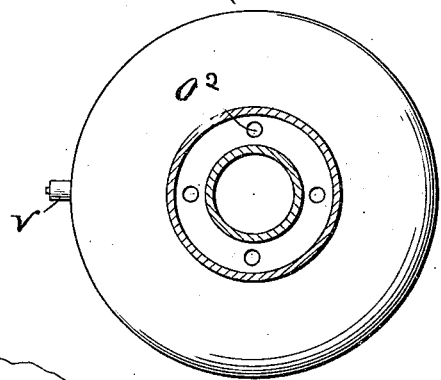
Figures 8 and 9 show the top of the container with openings or valve ports of a different number into the top of the vacuum jacket or compartment.
Figure 9:
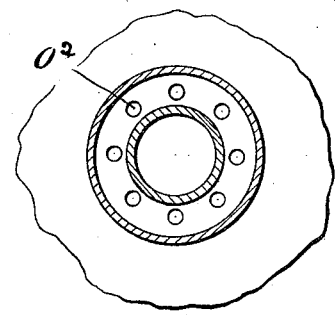

Figures 1 and 2 show one form of our container which may resemble somewhat in shape and in the kind of spring used, a fruit jar. When the spring $S^2$ is closed over the top B of the container A so as to hold the same down tightly, the extension of the said spring holds down the washer W' tightly over the port of the air intake valve O in the vacuum jacket or compartment of the container and seals tightly said valve O against the entrance of any air into the vacuum jacket or compartment J. When the spring $S^2$ is snapped up so as to release the cover B it likewise raises the washer carried by the part C attached to the spring $S^2$ from the port of the air intake valve O and permits the air to instantly break the vacuum in the vacuum chamber or compartment J by rushing into said chamber.

Figures 3 and 4 show another form of container wherein the "fruit jar" type of spring $S^2$ holds down tightly the cover B on the container A and likewise causes the stem $R^2$ of the port of the rotary air intake valve to close the said intake valve O'. When the spring $S^2$ is snapped up to release the top B to permit it to be raised from the container A, at the same time the spring $S^2$ turns the valve stem, $R^2$, in a rotary direction on its axis and opens the port of the intake valve O' and lets the air enter, or rush, into the jacket or compartment J and break the vacuum.

Figures 5 and 6 show the valve of the structure of Figures 3 and 4 in side view.

Figure 7:
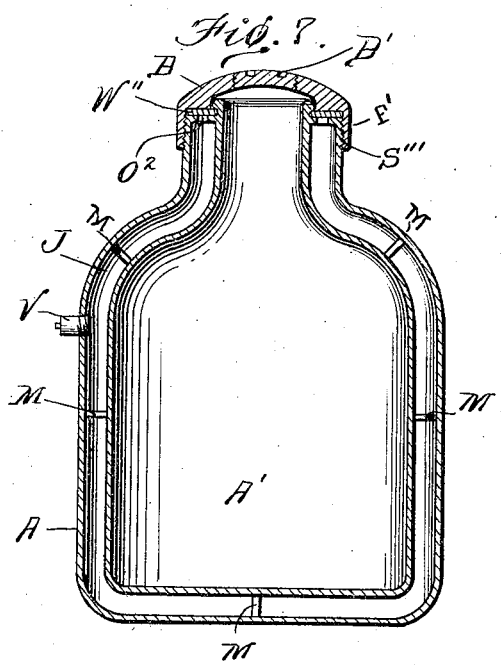
Figure 7 shows our preferred form of container.

In Figure 7 is shown what is for a number of reasons our preferred form of invention, because, among other things, it is simple in structure, efficient and inexpensive.

A is a vacuum container with its interior chamber A' to receive the food or other materials to be transported and B is the cover or screw cap upon which is an inner screw thread upon its lower part or flange F' which screws into a corresponding thread on the upper part of the body of the container A and when screwed down presses a washer W on a hole or valve port $O^2$ or a series of intake valve-ports or holes or openings O² on the end of the vacuum jacket or compartment J in proximity to the top B, so that the washer closes said valve ports or openings or holes O² tightly sealed against the air and maintains a vacuum in the vacuum jacket or compartment J when said jacket is depleted of air through the valve V after the cover B has been screwed down upon the container A. It is obvious that it is a matter of choice how many valve ports or openings as O² are found in the end of the vacuum jacket or compartment J. In some cases one valve port or hole or opening O² will be enough and in some cases several valve ports or holes symmetrically placed might be used. Such arrangements of valve ports or holes are shown in Figures 16 and 17, four being shown in Figure 16 and eight in Figure 17.

In certain cases where it is desired upon the final delivery of the container to the ultimate purchaser or user to still maintain the vacuum for a further period, an inner circular piece or sub-cover, B', may be screwed into the main cover B in such a way that it cannot be removed from the cover except by the use of a special instrument, such as the normal customer would not have. This is shown in the cover in Figure 15.

It is obvious that the material of which the body of the container is made may be such as would be suited to the particular use. For example a container might be made of sheet iron or so-called galvanized iron, or it might in certain cases be made of glass, or perhaps of aluminum.

In all forms of the container it is preferable to use strengthening pieces or braces between the inner and outer sides of the vacuum jacket or compartment, such as are shown at M in Figure 7. In fact any form of bracing device could be used, such as a horizontal or vertical girdle-like structure, for example.

In the claims of our application we have used the expression "a container comprising a body portion having spaced walls providing a unitary vacuum compartment or chamber." We intend to mean by this expression that the vacuum jacket or compartment J around the container A is to have during use no connection whatever with any other chamber or receptacle (except the preliminary and temporary connection through the exhausting valve with a temporarily connected air depleting pumping apparatus prior to shipment). That is in case the cover of the container is made in the form of a relatively small vacuum jacket, said small jacket is to be entirely separated and completely disconnected from the main vacuum jacket or compartment, and is to be depleted or exhausted of air by a separate connection to an air depleting pumping means.

In most cases, however, the cover would comprise a heat insulating material such as cork, felt, asbestos, or wood, of sufficient thickness to form an efficient heat insulating body.

When the cover comprises a hollow body containing an air space or comprises a small permanent vacuum space, it is obvious that said space would have necessarily no connection whatever with the main vacuum chamber or jacket or compartment J.

We claim:

1. A container comprising a body portion having spaced walls providing a unitary vacuum compartment, a lid or cover for said container, a depleting or exhausting valve connected to said compartment and means associated with the lid or cover of said container, to close said inlet opening when the cover is applied and to permit destruction of the vacuum when the cover is removed.

2. A container comprising a body portion having spaced walls providing a unitary vacuum compartment, a lid or cover for said container, a depleting or exhausting valve connected with said vacuum compartment and means associated with the cover or lid and operable to break the vacuum when desired.

3. A container comprising a body portion having spaced walls providing a unitary vacuum compartment, a lid or cover for said container, a depleting or exhausting valve connected to said compartment, a normally closed air intake port connected to said vacuum compartment which intake port is opened by the raising of the lid or cover of the container thereby admitting air into the vacuum compartment.

4. A container comprising a body portion having spaced walls providing a unitary vacuum compartment, a lid or cover for said container, a depleting or exhausting valve connected with said vacuum compartment, normally closed air intake ports connected to said compartment, and means associated with and operated by the movement of the cover or lid of the container to open said air intake ports to admit air into said vacuum compartment.

5. A container comprising a body portion having spaced walls providing a unitary vacuum compartment, a lid or cover for said container, a depleting or exhausting valve connected to said vacuum compartment, a normally closed air-intake opening or port connected with said vacuum compartment and a washer for tightly closing said port or opening, the washer being relieved from pressure and being made capable of removal when and by the removal of the cover or lid.

6. A container comprising a body portion having spaced walls providing a unitary vacuum compartment, a lid or cover for said container, a depleting or exhausting valve connected with said vacuum compartment, a port or hole in said vacuum compartment in proximity to the cover or lid of said container, and an interposed washer or similar device to keep the vacuum intact in the said vacuum compartment, the said cover or lid fitting tightly down upon the said washer and hole or port.

7. A container comprising a body portion having spaced walls providing a unitary vacuum compartment, a lid or cover for said container, a depleting or exhausting valve connected with said vacuum compartment, an opening or intake port in said compartment near the container-lid or cover, a washer or equivalent device which when the container is closed is pressed tightly down over the port or opening and a cap or cover fastened down tightly upon the washer and container to close the port or opening into the vacuum compartment and also to close the container.

8. A container comprising a body portion having spaced walls providing a unitary vacuum compartment, a lid or cover for said container, a depleting or exhausting valve connected with said vacuum compartment, an opening or inlet port in said compartment near the container's top, a washer or equivalent device which when the container is closed is pressed tightly down over the inlet port or opening and a screw-cap or cover screwed down upon the washer and container to close the inlet port or opening into the vacuum compartment and also to close the container.

In testimony whereof we affix our signatures.

WILLIAM B. WRIGHT.
WILLIAM M. FAIRFAX.